Figure 1:
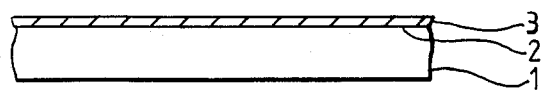

United States Patent [19]

Purdy

[11] Patent Number: 4,565,738
[45] Date of Patent: Jan. 21, 1986

[54] MULTIPLE-LAYER POLYOLEFIN FILMS

[75] Inventor: John R. Purdy, Hertfordshire, England

[73] Assignee: Imperial Chemical Industries, PLC, London, England

[21] Appl. No.: 612,919

[22] Filed: May 22, 1984

Related U.S. Application Data

[63] Continuation-in-part of Ser. No. 514,609, Jun. 1, 1983, abandoned.

[30] Foreign Application Priority Data

Jun. 1, 1983 [GB] United Kingdom ................ 8315001

[51] Int. Cl.⁴ ............................................ B32B 27/32
[52] U.S. Cl. .................... 428/349; 428/516; 428/520; 428/522; 525/88; 525/95
[58] Field of Search ............ 428/349, 347, 516, 515, 428/520, 522; 525/240, 88, 95

[56] References Cited

U.S. PATENT DOCUMENTS

| | | | |
|---|---|---|---|
| 4,147,827 | 4/1979 | Breidt et al. | 428/519 |
| 4,230,767 | 10/1980 | Isaka et al. | 428/349 |
| 4,297,411 | 10/1981 | Weiner | 428/516 |
| 4,393,115 | 6/1983 | Yoshii et al. | 428/349 |

FOREIGN PATENT DOCUMENTS 7101278  4/1965  Japan .................................. 428/349

Primary Examiner—Edith Buffalow
Attorney, Agent, or Firm—Cushman, Darby & Cushman

[57] ABSTRACT

A composite multiple-layer film, suitable as a packaging film, having a base layer of a propylene polymer and at least one surface layer formed from a blend of a propylene-ethylene block copolymer and an ethylene-higher olefin random copolymer. The composite film is preferably coextruded and is suitable as a substrate for additional polymeric layer(s), such as heat-sealable coatings, which may be adhered to the substrate by a polymeric primer resin.

10 Claims, 5 Drawing Figures

MULTIPLE-LAYER POLYOLEFIN FILMS

This application is a continuation-in-part of application Ser. No. 514,609, filed June 1, 1983, now abandoned.

This invention relates to a polyolefin film and, in particular, to a multiple-layer polyolefin film.

The packaging industry requires large quantities of heat-sealable film, which can be exposed to temperatures at which the film can be sealed to itself without impairment of the film integrity. Polyolefins are in demand as film-forming materials by virture of their strength and clarity but, in general, exhibit relatively poor heat-sealing characteristics. Attempts to improve the latter usually involve the creation of a composite, multiple-layer film structure having a relatively poorly sealable polyolefin film base and a surface layer of a heat-sealable material which can be melted at a temperature below that at which the polyolefin begins to soften. To be effective, this layer of heat-sealable material must be sealable over a relatively wide temperature range, must adhere securely to the film base, and must be sealable to itself to provide a bond of adequate strength—usually referred to as the heat-seal strength.

If an olefin copolymer, rather than a less expensive olefin homopolymer, base is employed, an improvement in inter-layer adhesion and heat-seal strength is generally observed, but only at the expense of a deterioration in film clarity and stiffness. We have therefore investigated the possibility of employing a composite, multiple-layer film (comprising an olefin homopolymer base layer sandwiched between layers of a random olefin copolymer) as a substrate for a polymeric, heat-sealable coating layer. However, the resultant films, although exhibiting tolerable stiffness, clarity and heat-seal strength, yielded tearable, rather than the preferred peelable, heat seals. Furthermore, considerable difficulties were encountered during a tubular film-forming process as a result of an excessive accumulation of abrasive debris and foreign matter on the lips of the film extrusion die—with consequential scratching of the cast film extrudate. In practice, considerable film production was lost by frequent bursting of the film bubble formed in the orienting zone of the tubular process, and by the need to effect regular removal of the accumulated contamination from the extrusion die.

We have now devised a multiple-layer film which overcomes or substantially reduces the aforementioned difficulties, thereby simplifying the production process, and which is suitable for incorporation into heat-sealable films which yield peelable seals.

Accordingly, the present invention provides a multiple-layer film comprising a polyolefin base layer and, on at least one surface thereof, a receptive layer wherein
  the polyolefin of the base layer comprises a propylene polymer and the at least one receptive layer comprises a blend of
(a) a propylene-ethylene end block copolymer containing from 1 to 20% of ethylene by weight of the end block copolymer, and
(b) an ethylene-monoalphaolefin random copolymer containing from 1 to 15% by weight of the random copolymer of a monoalphaolefin the molecule of which contains from 3 to 10 carbon atoms,
the weight ratio of the propylene-ethylene end block copolymer to the ethylene-monoalphaolefin random copolymer in the blend being within a range of from 0.5:1 to 99:1.

A multiple-layer film as hereinbefore defined is "self-supporting" in the sense that it is capable of independant existance in the absence of a supporting substrate. Indeed, in a preferred embodiment of the invention the defined film itself serves as a substrate for at least one additional film-forming polymeric layer adhered to the receptive layer.

The polymer forming the base layer is suitably a propylene homopolymer or a propylene-olefin copolymer, the base for a packaging film conveniently comprising either a propylene-ethylene block copolymer containing up to 15% of ethylene by weight of the copolymer or, preferably, a propylene homopolymer.

The blend layer on at least one surface of the base layer is "receptive" in the sense that it is capable of adhering to another polymeric layer. The latter includes the receptive layer per se, for example, when the multiple-layer film is arranged with two portions of the receptive layer in contact and these are united by a suitable technique, such as heat-sealing. However, the receptive layer is also capable of adhering to a polymeric layer of differing composition which will modify or confer additional properties on the film—for example, by improving the moisture—and/or gas-barrier characteristics of the film.

The propylene-ethylene end block copolymer component of the blend comprises at least one polymer segment each of propylene and of ethylene attached in an end-to-end relationship, and is conveniently prepared by a sequential polymerisation process in which an initial charge of propylene is fed to a catalysed polymerisation zone followed by a subsequent charge of ethylene either alone or mixed with a further quantity of propylene. A suitable sequential polymerisation process is disclosed in British Pat. No. 1014944.

The ethylene content of the propylene-ethylene end block copolymer, determined by peak height measurement of the infra-red spectrum of the copolymer, is within a range of from 1 to 20, particularly from 2 to 15, preferably from 3 to 10, and particularly preferably from 4 to 6 (for example 5) percent by weight of the copolymer.

The ethylene-monoalphaolefin random copolymer component of the blend comprises a polymer chain in which the ethylene and monoalphaolefin units are distributed in accordance with random statistics with no preference for long runs of one or other unit beyond that required to achieve the overall desired composition. Such copolymers are conveniently prepared by simultaneously feeding ethylene and a higher monoalphaolefin in the desired proportions to a catalysed polymerisation zone.

Suitable monoalphaolefin monomers for copolymerising with ethylene to form the random copolymer component of the blend include propylene, pentene-1, hexene-1, heptene-1, octene-1 and decene-1, although butene-1 has proved to be a particularly suitable comonomer.

The monoalphaolefin content of the random copolymer, determined by peak height measurement of the infra-red spectrum of the copolymer, is within a range of from 1 to 15, conveniently from 1 to 10, preferably from 2 to 7, and particularly preferably from 3 to 4, percent by weight of the copolymer.

Formation of the various olefin homo- and co-polymers herein described as being suitable for use in the multiple-layer films of the invention is conveniently effected in the presence of an organo-metallic catalyst, such as a transition metal compound with an organo-metallic activator. Particularly useful compounds of this type are titanium halide compounds activated with aluminium alkyl compounds. A preferred material is a titanium chloride.

Polymerisation of the olefin monomers may be effected in known manner—for example, in the presence or absence of an inert diluent, such as a suitably purified paraffinic hydrocarbon, in the liquid phase using an excess of liquid monomer as the polymerisation medium, or in the gas phase, the latter term being herein employed to indicate the essential absence of a liquid medium.

Although the propylene-ethylene end block copolymer and the ethylene-monoalphaolefin random copolymer components of the blend layer may be present in a weight ratio of from 0.5:1 to 99:1, it is preferred that the ratio should be within a range of from 1:1 to 3:1, particularly from 1.22:1 to 2.33:1. A weight ratio of 2:1 is particularly suitable.

Formation of the blend is conveniently effected by vigorously mixing the appropriate quantities of the block and random copolymers. A dry blending technique in which, for example, the components are physically mixed in a paddle blender, may be employed. If desired, and preferably, the physical mixing technique is supplanted or supplemented by a melt blending technique in which the components are melt-extruded, quenched and chopped into finely divided (powder or granular) form to ensure the production of a homogeneous copolymer blend.

Application of the copolymer blend layer on to the base layer is conveniently effected by any of the laminating or coating techniques conventionally employed in the production of composite films. Preferably, however, the copolymer blend layer is applied to the base by a coextrusion technique in which the polymeric components of the base and blend layers are coextruded into intimate contact while each is still molten. Preferably, the coextrusion is effected from a multi-channel annular die so designed that the molten polymeric components constituting individual layers of the composite film merge at their boundaries within the die to form a single composite structure which is then extruded from a common die orifice in the form of a tubular extrudate.

Preferably, a composite film of the invention is oriented by stretching at temperature above the glass transition temperature of the polymer(s). For example, orientation of a film having a propylene homopolymer base layer is conveniently effected at a temperature within a range of from about 145° to 165° C. Orientation may be effected uniaxially, by stretching the film in one direction, or biaxially, by stretching the film in each of two mutuaaly perpendicular directions in the plane of the film, and the biaxial orientation may be balanced or unbalanced, for example with the higher degree of orientation of an unbalanced film in a preferred direction—usually the transverse direction. Conveniently, the polyolefin base material and the copolymer blend layer are coextruded in the form of a composite tube which is subsequently quenched, reheated, and then expanded by internal gas pressure to induce transverse orientation, and withdrawn, at a rate greater than that at which it is extruded, to stretch and orient it in the longitudinal direction. Alternatively, a flat, multiple-layer film may be oriented by simultaneous or sequential stretching in each of two mutually perpendicular directions by means of a stenter, or by a combination of draw rolls and a stenter.

The degree to which the film is stretched depends to some extent on the ultimate use for which the film is intended, but for a polypropylene-based packaging film we find that satisfactory tensile and other properties are developed when the film is stretched to between three and ten, preferably, seven, times its original dimensions in each of the transverse and longitudinal directions.

After stretching, the polymeric film is normally "heat-set", while restrained against shrinkage or even maintained at constant dimensions, at a temperature above the glass transition temperature of the polymer and below its melting point. The optimum heat-setting temperature can readily be established by simple experimentation, and for a polypropylene base layer, "heat-setting" is conveniently effected at temperatures in the range of from 100° C. to 170° C. Heat-setting may be effected by conventional techniques—for example by means of a stenter system, or by a system of one or more heated rollers as disclosed, for example, in British Pat. No. 1124886. Alternatively, or additionally, the film may be subjected to a constrained heat treatment of the kind described in European patent publication No. 23776 Al.

If desired, the receptive surface(s) of a multiple-layer film according to the present invention may be subjected to a chemical or physical surface-modifying treatment, a preferred treatment, because of its simplicity and effectiveness, being to subject the film surface to a high voltage electrical stress accompanied by corona discharge. If the composite film is to serve as the substrate for a subsequently applied polymeric layer or layers, such surface-modifying treatment is particularly desirable to improve the adhesion between the receptive layer and the applied layer(s).

In applying an additional coating layer, such as a polymeric heat-sealable layer, to a polyolefin film substrate it is generally desirable first to apply an intermediate primer or anchor coating layer to the substrate to ensure adequate adhesion between the substrate and subsequently applied additional coating layer. Althouogh a composite mulitple-layer film according to the invention may be utilized as such a substrate per se, it is preferred to utilise as a substrate for a subsequently applied layer a composite multiple-layer film to the receptive surface(s) of which has been applied a primer or anchor coating layer.

The primer may be any material, usually polymeric, capable of acting as an adhesion promotor between the substrate and subsequently applied layer. A particularly suitable primer comprises an interpolymerised condensation resin prepared either as described in British Pat. No. 1134876, by condensing a monoaldehyde with an interpolymer of acrylamide or methacrylamide with at least one other unsaturated monomer, or, as described in British Pat. No. 1174328, by condensing a monoaldehyde with acrylamide or methacrylamide, and subsequently interpolymerising the condensation product with at least one other unsaturated monomer, the condensation reaction being effected in both cases in the presence of an alkanol containing from one to six carbon atoms.

Preferred interpolymerised condensation resins for use as primers comprise a copolymer derived from up to 90% by weight of styrene, up to 80% by weight of an alkyl acrylate, up to 15% by weight of methacrylic acid, and from 5% to 25% by weight of acrylamide which has been condensed with a solution of formaldehyde in n-butanol containing from 0.2 to 3 equivalents of formaldehyde for each amide group in the copolymer. A particularly useful resin is a 50% solids solution of a copolymer resin containing 38.5 parts of styrene, 44 parts of ethyl acrylate, 2.5 parts of methacrylic acid, and 15 parts of acrylamide which has been condensed with 5.2 parts of formaldehyde in n-butanol. This resin is then diluted to a solution of an appropriate solids content, for example 5 to 20% solids, with, for example, industrial methylated spirits, or a 50:50 mixture thereof with xylene (the parts referred to here and throughout the specification are the proportions of the constituents by weight). Another useful composition is one in which the ethyl acrylate has been replaced by 2-ethyl hexyl acrylate.

A catalyst should preferably be added to the composition to promote the cross-linking of the resin to improve the adhesion between the applied coating and the substrate film.

The primer resin may be applied to a multiple-layer film by conventional coating techniques—for example, by a gravure roll coating method. The resin is conveniently applied as a dispersion or as a solution. Economically it would be preferable to apply the resin as a dispersion in water. Aqueous dispersion techniques have the added advantage that there is no residual odour due to the solvent present which is generally the case when an organic solvent is used. However, when using aqueous techniques it is usually necessary to heat the film to a higher temperature to dry off the dispersant than with systems using an organic solvent or dispersant. Furthermore, the presence of a surfactant, which is generally used to improve the dispersion of the coating in water, tends to reduce the adhesion between the resin and the base film. Thus, it is preferred to apply the resin from an organic solvent or dispersant. Examples of suitable organic solvents include alcohols, aromatic hydrocarbon solvents, such as xylene, or mixtures of such solvents as is appropriate.

Additional coating media may be applied to a substrate film as hereinbefore described for a variety of reasons—for example, to improve one or more of the film gas-barrier, moisture-barrier, heat-sealing and optical characteristics. These coating media are generally of a polymeric, particularly a polyolefinic, nature, such as propylene-ethylene or propylene-butene-1 copolymers, or propylene-ethylene-butene-1 terpolymers, or blends thereof—optionally with olefin homopolymers.

Particularly suitable polymeric additional coating media include copolymers of vinylidene chloride with acrylonitrile because they give hard coatings with good heat-seal strengths, and are also resistant to moisture and have low gas permeability. It is preferred to use copolymers containing between 80% and 95% by weight of vinylidene chloride and from 5% to 20% by weight acrylonitrile. These copolymers may contain other ethylenically unsaturated monomers such as acrylic acid, itaconic acid and methacrylic acid, but a particularly preferred resin comprises a copolymer containing 88 weight % of vinylidene chloride and 12 weight % of acrylonitrile. The coating may be applied to the receptive or primer layer of the film substrate as a solution or a dispersion, but the solvent or dispersant should not be such that it will dissolve any resin coating already on the film. For economic reasons application as an aqueous dispersion is preferred. A vinylidene chloride-acrylonitrile copolymer coating medium is conveniently employed as an aqueous dispersion containing from about 30 to about 60% by weight of the copolymer based on the weight of the dispersion, i.e. a dispersion having a dynamic viscosity range at 20° C. from about 0.0015 to about $0.06 Nsm^{-2}$.

The additional coatings may be dried by conventional methods, for example—by passing the coated web through an oven maintained at an appropriate temperature. A float oven in which the coated web floats on a current of heated air is particularly suitable.

Multiple-layer films according to the invention may exist in a variety of configurations, the simplest embodiment comprising a base layer and, on one surface thereof, a blend layer, i.e. a two-layer film. However, it is usually preferred to provide at least a three layer film comprising a base layer having a blend layer on each surface thereof. Depending on the selection of subsequently applied primer and additional layers, films variously comprising at least 2, 3, 4, 5, 6 or 7 layers may be fabricated.

Composite films in accordance with the invention may be prepared in a range of thicknesses governed primarily by the ultimate application for which a particular film is to be employed. Films, having a total thickness in a range extending from 2.5 to 100 microns ($\mu$m) are of general utility, but for packaging applications we prefer to employ film of from about 10 to 50, preferably from 15 to 30, microns in total thickness. Generally, the base layer will comprise at least 50%, preferably from 60 to 95%, and, particularly preferably, from 75 to 85%, of the total film thickness. For example, a typical packaging film will have a base layer thickness of from 19 to 28 $\mu$m, at least one receptive layer of thickness from 0.2 to 1 $\mu$m, at least one primer layer of thickness from 0.05 to 0.75 $\mu$m, and at least one additional surface layer of thickness from 0.25 to 3.0 $\mu$m. Corresponding layers applied to opposite surfaces of the base layer may, but need not, be of the same thickness. Neither need they be of identical composition.

One or more of the layers of the composite multiple-layer films of the invention may conveniently contain any of the additives conventionally employed in the manufacture of thermoplastic films. Thus, additives such as dyes, pigments, lubricants, anti-static agents, anti-oxidants, anti-blocking agents, surface-active agents, stiffening aids, slip aids, gloss-improvers, prodegradants, and ultra-violet light stabilizers may be employed. If desired, such of the aforementioned additives as may be required may be applied directly to a receptive surface of the film, preferably prior to orientation—for example by a wash-coating technique.

The following test methods are employed in assessing films according to the invention:

(a) HEAT-SEAL STRENGTH

Two strips of a multiple-layer film having at least one heat-sealable surface layer are placed with the heat-sealable surfaces in contact with each other, and the ends of the strips sealed together between the jaws of a Sentinel Heat Sealer, Model No. 12AS, only one jaw of the unit being heated. The strength of the seal is measured by cutting from the sealed-together strips of film, which have been allowed to cool to ambient temperature, a strip 25 mm wide and some 100 mm long, the heat seal extending across the entire width of the strip and having an area of some 25×25 mm. The unsealed ends of the strip are then attached respectively to a dynamometer and a gripping surface, a load is applied to the gripping surface, and the load required to separate the strips in the sealed area, at a rate of 30.5 cms per minute, is recorded by the dynamometer, and expressed as a seal strength of x g/25 mm, where x is the load in grammes.

(b) SEAL FAILURE

Assessed by visual inspection of film seals formed and pulled apart as in (a) above. Pulled apart film remains intact in peelable seal but ruptures in tearable seal.

(c) IMPACT

Film bags (150×125 mm), provided with a heat-sealed closure (120° C; 0.1MNm$^{-2}$; 2 secs) and containing 230 g of plastics discs were dropped from a height of 1.5 meters onto a concrete surface. The proportion of seals rupturing on impact was assessed on a scale of 0 to 10, 0 indicating complete opening and 10 indicating no damage.

(d) NARROW ANGLE HAZE

Measured using a Gardner Pivotable Sphere Hazemeter and defined as the percentage of transmitted light which in passing through a film specimen deviates from the incident beam by more than 2.5° on average.

(e) WIDE ANGLE HAZE

Measured according to ASTM D-1003-61.

(f) CURL

A strip of film 25 mm wide and 200 mm long is clamped to the top of a vertical plate ensuring that the vertical fall of the film coincides with the vertical line of the plate. The lower, free end of the film tends to curl upwardly, and the observed degree of curvature is assessed by matching the film against an inscribed template. Film curl of less than about 30° is good, from about 30° to 60° is acceptable, and a curl of greater than 60° is poor.

(g) SEALING THRESHOLD

The minimum sealing temperature (°C.) to yield a seal of strength 200 g/25 mm, the seals being formed on a Sentinel Heat Sealer, model No. 12AS under a jaw pressure of 0.1MNm$^{-2}$ and with a jaw closure time of 2 seconds.

The invention is illustrated by reference to the accompanying drawings in which:

FIG. 1 depicts a side elevation of a portion of a multiple layer film having a propylene polymer base 1 and on a surface 2 thereof a thin receptive layer 3 formed from a blend of a propylene-ethylene end block copolymer and an ethylene-butene-1 random copolymer.

Figure 2:
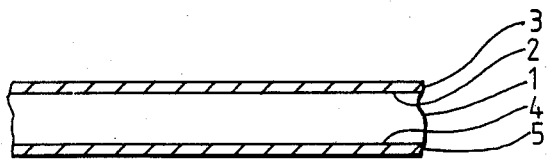

FIG. 2 depicts a side elevation of a similar film portion having, on the second surface 4 of base 1, a receptive blend layer 5.

Figure 3:
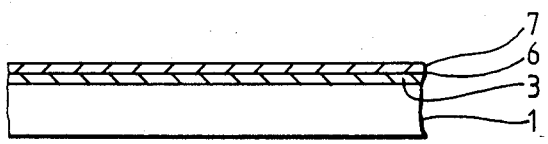

FIG. 3 depicts a side elevation of a portion of a three-layer film comprising a base 1, a receptive layer 3 and, on the outer surface 6 of layer 3, a polymeric heat-sealable layer 7.

Figure 4:
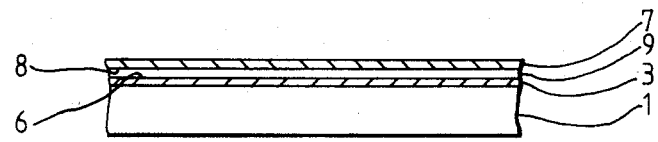
Figure 5:
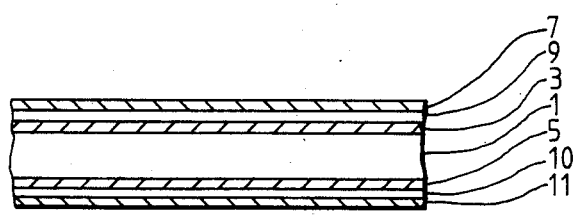

FIG. 4 depicts a side elevation of a portion of a four-layer film comprising a base layer 1, a receptive layer 3, a heat-sealable layer 7, and, interposed between outer surface 6 of layer 3 and inner surface 8 of layer 7, an intermediate polymeric anchor coating layer 9, and FIG. 5 depicts a side elevation of a portion of a seven-layer film comprising a base layer 1, having opposed receptive layers 3,5, anchor coating layers 9,10, and outermost heat-sealable layers 7,11.

The invention is further illustrated by reference to the following Examples.

EXAMPLE 1

This is a comparative Example not according to the invention.

From a triple channel annular die were coextruded a propylene homopolymer and a propylene-ethylene end block copolymer containing about 6% by weight of ethylene (by infra-red peak height measurement), so as to form a polypropylene tube the internal and external surfaces of which were coated with a receptive layer of the propylene-ethylene (P/E) copolymer.

The coated polypropylene tube was cooled by passage over a mandrel within the tube, and externally quenched by passage through a water bath surrounding the mandrel, heated to stretching temperature, expanded by internal gas pressure, and withdrawn from the expansion zone at at rate greater than that at which it was fed thereto, so that the tube was stretched to seven times its original dimensions in both the direction of extrusion and in a direction transverse thereto.

Throughout the film-forming operation the expanded tubular extrudate (bubble) exhibited significant positional instability-wandering laterally relative to the longitudinal axis of the system so that the extrudate was not uniformly heated during its passage through the expansion zone. The resultant film therefore exhibited a non-uniform thickness profile and was commercially unacceptable.

Nevertheless, the stretched tubular film was opened out to form flat film which was subsequently heat-set at a temperature of about 130° C. on a matt-surfaced roller heat-setter of the kind described in British Pat. No. 1124886.

Discharge treatment of the heat-set film was effected by a single aluminium rod electrode extending across the entire width of the film, and connected to a Sherman GT60, 6 kilowatts, solid state corona treater, operating at 3 amps.

The thickness of the receptive propylene-ethylene end block copolymer layer on each surface of the resultant film was about 0.5 micron, the base layer having a thickness of about 20 microns.

Using a roller coating assembly, each receptive surface of the triple-layer film was coated with a solution (6 weight % solids content) in industrial methylated spirits of an interpolymerised primer resin containing 38.5 parts of styrene, 44 parts of ethyl acrylate, 2.5 parts of methacrylic acid, and 15 parts of acrylamide condensed with 5.2 parts of formaldehyde in n-butanol.

The resultant five-layer film was immediately passed through a drying oven maintained at a temperature of about 85° C. The thickness of the dried resin coating was approximately 0.125 μm on each surface of the film.

Using a roller coating assembly each primed surface of the film was then coated with an aqueous dispersion containing 42 wt % of a heat-sealable vinylidene chloride-acrylonitrile copolymer (88:12 by weight).

The resultant seven-layer web was dried in an oven at a temperature in a range of from about 120° to 130° C., and the thickness of the dried heat-sealable coating on each surface of the web was found to be approximately 1.80 μm.

Samples of the resultant seven-layer films were assessed in accordance with the hereinbefore described tests. Results are hereinafter recorded.

EXAMPLE 2

This is a comparative Example not according to the invention.

The procedure of Example 1 was repeated save that the receptive layer on each surface of the propylene homopolymer base layer was formed from an ethylene-butene-1 (E/B) random copolymer containing 3% by weight of butene-1.

During the coextrusion film-forming stage an abrasive deposit rapidly accumulated on the lips of the tubular extrusion die. This deposit was believed to be responsible for the observed frequent bursting of the film bubble. In addition, the oriented triple layer film (prior to anchor and top coating) was badly scratched.

EXAMPLES 3 TO 6

The procedure of Example 1 was repeated save that the receptive layer on each surface of the propylene homopolymer base layer was formed from a blend of the propylene-ethylene end block copolymer of Example 1 and the ethylene-butene-1 random copolymer of Example 2, the respective copolymer components of the blend, in the weight ratios specified in Table 1, having first been vigorously mixed in the dry state in a paddle blender, melt-extruded, quenched and cut to granular form.

Throughout the film-forming operation the inflated film bubble maintained a stable configuration, there was no evidence of an accummulation of debris on the lips of the extrusion die, the frequency of bubble bursting was reduced to an acceptable level and scratching of the film surface was not a problem.

An assessment of the respective films made in Examples 1 to 6 is provided in the accompanying Table 1.

TABLE 1

| Example | 1 | 2 | 3 | 4 | 5 | 6 |
|---|---|---|---|---|---|---|
| Receptive Layer | P/E | E/B | | P/E + E/B | | |
| Weight ratio P/E:E/B | | | 2.33 | 2.0 | 1.77 | 1.5 |
| Heat-Seal Strength (g/25 mm) | 240 | 340–570 | 368 | 427 | 433 | 449 |
| Seal Failure* | P | T | P | T/P | T/P | T |
| Impact at 1.5 m | 7.5 | 0.5 | 4.8 | 4.4 | 4.2 | 3.6 |
| Haze-Narrow Angle | 12.0 | 5.0 | 8 | 7 | 6 | 6 |
| Haze-Wide Angle | 3.0 | 2.0 | 2.6 | 2.2 | 2.2 | 2.2 |
| Curl** | Poor | Good | A | A | A | A |
| Sealing Threshold (°C.) | 111 | 120 | 111 | 111 | 112 | 116 |

*P = Peel; T = Tear
**A = Acceptable

EXAMPLE 7

This is a comparative Example not according to the invention.

The procedure of Example 2 was repeated save that the receptive layer on each surface of the propylene homopolymer base layer was formed from an ethylene-octene-1 (E/O) random copolymer containing about 7% by weight of octene-1.

During the coextrusion film-forming stage an abrasive deposit rapidly accummulated on the lips of the tubular extrusion die. This deposit was believed to be responsible for the observed frequent bursting of the film bubble. In addition, the oriented triple layer film (prior to anchor and top coating) was badly scratched.

EXAMPLES 8 TO 11

The procedure of Example 1 was repeated save that the receptive layer on each surface of the propylene homopolymer base layer was formed from a blend of the propylene-ethylene end block copolymer of Example 1 and the ethylene-octene-1 random copolymer of Example 7, the respective copolymer components of the blend, in the weight ratios specified in Table 2, having first been vigorously mixed in the dry state in a paddle blender, melt-extruded, quenched and cut to granular form.

Throughout the film-forming operation the inflated film bubble maintained a stable configuration, there was no evidence of an accummulation of debris on the lips of the extrusion die, the frequency of bubble bursting was reduced to an acceptable level and scratching of the film surface was not a problem.

An assessment of the respective films made in Examples 7 to 11 is provided in the accompanying Table 2.

TABLE 2

| Example | 7 | 8 | 9 | 10 | 11 |
|---|---|---|---|---|---|
| Receptive Layer | E/O | | P/E + E/O | | |
| Weight ratio P/E:E/O | | 1.22 | 1.5 | 1.85 | 2.33 |
| Heat-Seal Strength (g/25 mm) | 381 | 432 | 401 | 411 | 349 |
| Seal Failure* | T | T | T | T | P |
| Haze-Narrow Angle | 4 | 8 | 7 | 6 | 6 |
| Haze-Wide Angle | 1.8 | 2.1 | 2.0 | 2.1 | 2.0 |
| Sealing Threshold °C. | 115 | 108 | 108 | 112 | 110 |

*P = Peel; T = Tear

I claim:

1. A multiple-layer film comprising a polyolefin base layer and, on at least one surface thereof, a receptive layer wherein the polyolefin of the base layer comprises a propylene polymer and the at least one receptive layer comprises a blend of
   (a) a propylene-ethylene end block copolymer containing from 1 to 20% of ethylene by weight of the end block copolymer, and
   (b) an ethylene-monoalphaolefin random copolymer containing from 1 to 15% by weight of the random copolymer of a monoalphaolefin the molecule of which contains from 3 to 10 carbon atoms,
the weight ratio of the propylene-ethylene end block copolymer to the ethylene-monoalphaolefin random copolymer in the blend being within a range of from 0.5:1 to 99:1.

2. A multiple-layer film according to claim 1 wherein the polyolefin of the base layer comprises a propylene homopolymer.

3. A multiple-layer film according to claim 1 wherein the monoalphaolefin is butene-1.

4. A multiple-layer film according to claim 1 wherein the weight ratio of the propylene-ethylene end block copolymer to the ethylene-monoalphaolefin random copolymer in the blend is within a range of from 0.1:1 to 4:1.

5. A multiple-layer film according to claim 1 comprising a base layer and at least one coextruded receptive layer.

6. A multiple-layer film according to claim 1 wherein the at least one receptive layer has been subjected to a surface-modifying treatment.

7. A multiple-layer film according to claim 1 comprising a polymeric additional coating layer associated with the at least one receptive layer.

8. A multiple-layer film according to claim 7 wherein the additional coating layer comprises a vinylidene chloride-acrylonitrile copolymer.

9. A multiple-layer film according to claim 7 wherein the additional coating layer is bonded to the at least one receptive layer by an adhesion-promoting anchor coating resin.

10. A multiple-layer film according to claim 9 wherein the anchor coating resin comprises an interpolymerised condensation resin derived from a monoaldehyde, (meth) acrylamide and at least one unsaturated monomer.

* * * * *